Jan. 31, 1961 — W. T. ERIKSEN — 2,970,264
ELAPSED TIME INDICATORS
Filed May 31, 1957
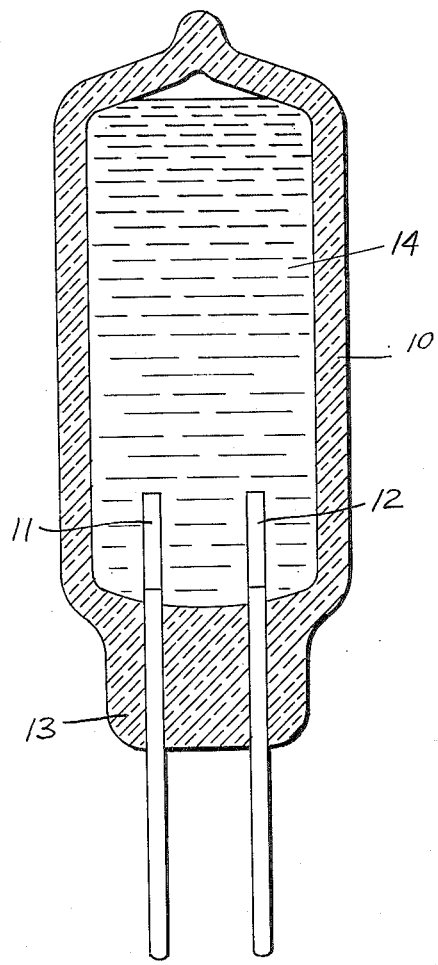
INVENTOR
WARREN T. ERIKSEN
BY Elmer J. Gorn
ATTORNEY United States Patent Office 2,970,264
Patented Jan. 31, 1961

2,970,264

ELAPSED TIME INDICATORS

Warren T. Eriksen, Wayland, Mass., assignor to Raytheon Company, a corporation of Delaware Filed May 31, 1957, Ser. No. 662,756

4 Claims. (Cl. 324—94)

This invention relates to elapsed time indicators, and, more particularly, to such indicators as depend for their operation upon the change in color of an electrolyte through which a current is passed.

When current is passed between two electrodes in an electrolyte, several changes take place. A certain amount of material is deposited out from the electrolyte on one of the electrodes. The extent of the increase in this deposit is a measure of the total current that has passed through the electrolyte during this interval of time. When the current is constant, this increase in the deposit is a measure of the time during which the current has flowed through the device. For light current flow and short time intervals this difference in deposit is very slight, requiring delicate scales to measure. Also, the electrode receiving the deposit must be removed from the electrolyte. This requires the destruction of the indicator every time a reading is taken or a special construction of the device to make the electrode easily removable and replaceable. With heavy currents flowing for a long time through the device the deposit visibly lengthens the electrode and this change in length can be measured. However, the growth may not be even, producing difficulties in obtaining an accurate determination of the length. This uneven growth is most likely to be the case if the device is not maintained in a fixed attitude.

Current in such a device is carried through the electrolyte by means of ions formed from the disassociation of the solute of the electrolyte. The flow through the electrolyte with a certain potential difference between the electrodes is in part determined by the concentration of the solute in the electrolyte. As the ions form from the disassociated solute and deposit on one of the electrodes, the concentration of the solute in the electrolyte becomes less and the resistance of the electrolyte increases. This increase in the resistance is a measure of the current that has flowed through the electrolyte. The resistance of the electrolyte may be measured in a bridge or other device for measuring electrical resistance. As the initial resistance of the device is small, any increase in this small quantity is difficult to measure accurately.

If the solute used to form the electrolyte is of a type imparting a characteristic color to the electrolyte, the intensity of this color will decrease with the passage of current as the solution of the electrolyte becomes less concentrated. This change in color is a convenient indication of the amount of current that has flowed through the device. An easily detected change in color results from the flow of even a moderate current for a matter of hours. This color can be initially matched to a chart by controlling the concentration of the solution forming the electrolyte and lighter shades on the chart calibrated to correspond to the flow of a constant known current through the device for different lengths of time. More accurate results can be obtained for a standard light source as the sole source of light and a photometer to measure the change in the light passing through the device. Such a device is not affected by the attitude in which it is mounted so long as the electrodes are completely immersed in the electrolyte. Devices operating on the measurement of the amount of material deposited are affected by the attitude in which the device is mounted. This is an important limitation on the use of such devices in portable equipment, such as electronic equipment used in airplanes.

In order to protect the device from ambient conditions, such as temperature, pressure and contamination, the electrolyte should be enclosed in a hermetically sealed envelope. During the electrolysis, oxygen may be given off. In an hermetically sealed envelope this oxygen cannot escape and pressure builds up that might eventually explode the device. This can be prevented by introducing a quantity of material that prevents formation of oxygen, thereby precluding any substantial amount of free oxygen from building up. The material used for this purpose must be such as not to interfere with the electrolysis. Such a material is ethyl alcohol which oxidizes to form acetic acid. Neither the ethyl alcohol nor the acetic acid interferes with the electrolysis while absorbing the oxygen generated by the electrolysis. Thus no oxygen accumulates, removing the danger of the device exploding from oxygen pressure.

Other and further advantages will be apparent as the description progresses with reference to the drawing which shows a longitudinal section of a device embodying the invention.

In the drawing, the reference numeral 10 designates an envelope of insulating transparent material, preferably glass, which can conveniently be formed from the blank for the envelope of a subminiature tube or that for a neon light. A pair of electrodes 11 and 12, one used as a cathode and formed of conductive material, preferably chemically inert, such as platinum, and the other used as the anode and formed of a conductive material that is the cation of the salt used for the electrolyte. These electrodes are introduced at one end of the envelope and sealed by means of a pinch seal 13. In the interests of forming a hermetic seal with the glass envelope 10, the portion of each electrode 11 or 12 that passes through the seal 13 is formed of some alloy, such as Dumet, that has the same thermal coefficient of expansion as the glass used for the envelope. The envelope is filled with an electrolyte 14. This electrolyte is an aqueous solution of a colored salt of a metal, such as copper sulphate. The degree of the concentration of the metallic element in the salt should be indicated by the intensity of the color of the electrolyte. The electrolytes formed of salts of copper, nickel, cobalt, iron, silver, manganese, titanium, and vanadium display such a characteristic color and give an irreversible process which takes place at a lower potential than that at which oxygen is discharged from the aqueous solution. The ethyl alcohol forms acetic acid, and neither the ethyl alcohol nor the resulting acetic acid interferes with the electrolysis. In mounting the electrodes, it is important that the Dumet extend only a short distance into the electrolyte and that Dumet portion of both electrodes extend into the envelope. Should only the Dumet portion of one lead extend into the electrolyte battery, action will take place between this electrode and the other, interfering with the desired electrolysis.

In a representative case the electrolyte is 2 millimeters of a 0.15 molar percent copper sulphate solution in water with ethyl alcohol added to absorb any oxygen formed. Such an electrolyte was found to pass 10 percent of the light of a wavelength of 6500 A. initially and to give useful results for 2,000 hours when passing 5.14 microamperes of direct current. This device when used with a photometer measured elapsed time to an accuracy of ±5 percent.

In operation, the initial color of the electrolyte is determined by comparison with a color chart, or more accurately by means of a photometer. The device is then inserted in the circuit of interest and when the operating time is to be determined, the color is again determined by the chart, or photometer, calibrated to give a reading in hours of use. In special cases where it is known that when current passes through the device it does so at a known rate for a known interval of time, the change in color of the electrolyte can give an indication of how often the device has conducted during an interval of time.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. An integrating current-indicating device comprising a hermetically sealed envelope of transparent insulating material, a body of electrolyte consisting of an aqueous solution of a colored inorganic salt of a metal from the group consisting of copper, cobalt, nickel, iron, silver, manganese, titanium and vanadium, said solution including a small proportion of ethyl alcohol, and a pair of electrodes at least partially immersed in said body of electrolyte, one of said electrodes being the cation of the salt of the electrolyte, and the other of a material that does not react with the electrolyte.

2. An integrating current-indicating device comprising a hermetically sealed envelope of transparent insulating material, a body of electrolyte consisting of an aqueous solution of copper sulphate, said solution including a small proportion of ethyl alcohol, and a pair of electrodes, one of copper and the other of a material that does not react with such electrolyte.

3. An integrating current-indicating device comprising a hermetically sealed envelope of transparent insulating material, a body of electrolyte consisting of an aqueous solution of copper sulphate, said solutions including a small proportion of ethyl alcohol, and a pair of electrodes, one of copper and the other of platinum.

4. An integrating current-indicating device comprising a body of electrolyte consisting of an aqueous solution of colored inorganic salt of a metal from the group consisting of copper, cobalt, nickel, iron, silver, manganese, titanium and vanadium, a container for said body of electrolyte, a cathode electrode of the cation of the salt of such electrolyte and an anode electrode of a material inert to such electrolyte, both of said electrodes being at least partially immersed in said body of electrolyte.

References Cited in the file of this patent

UNITED STATES PATENTS

| | | |
|---|---|---|
| 526,114 | Placet et al. | Sept. 18, 1894 |
| 720,550 | Apple | Feb. 17, 1903 |
| 925,064 | Witney | June 15, 1909 |
| 1,346,090 | Hatfield et al. | July 6, 1920 |
| 2,135,873 | Jones | Nov. 3, 1938 |
| 2,655,634 | Kroko | Oct. 13, 1953 |

OTHER REFERENCES

German Article, "Electroanalytische Schnellmethoden," by Fischer et al., printed in 1926 by Stuttgart, Verlag Von Ferdinand Enke, pages 138–139.